(No Model.)                2 Sheets—Sheet 1.

T. H. DILLON.
SAW HAMMERING MACHINE.

No. 501,769.          Patented July 18, 1893.

WITNESSES:
William Goebel
C. Sedgwick

INVENTOR
T. H. Dillon
BY
Munn & Co.
ATTORNEYS.

(No Model.) 2 Sheets—Sheet 2.
T. H. DILLON.
SAW HAMMERING MACHINE.
No. 501,769. Patented July 18, 1893.
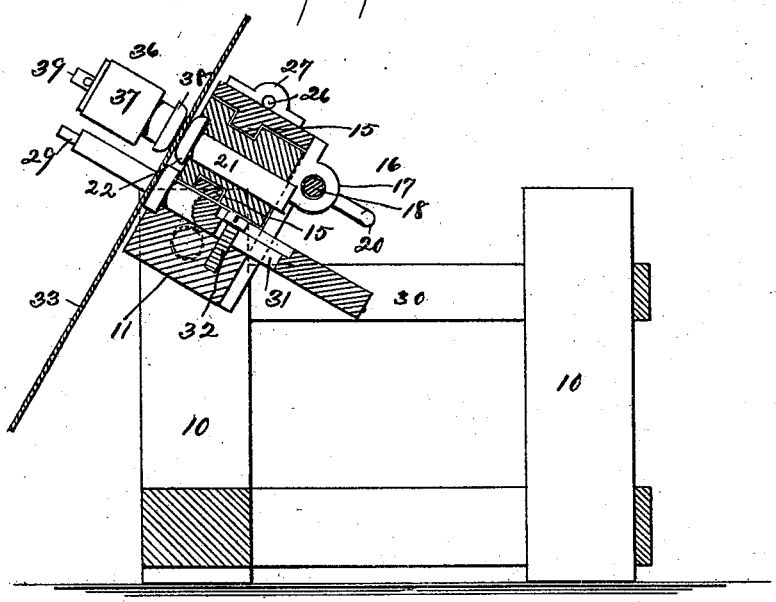
WITNESSES:
William Goebel
C. Sedgwick
INVENTOR
T. H. Dillon
BY Munn & Co
ATTORNEYS.

UNITED STATES PATENT OFFICE.

THOMAS H. DILLON, OF BEAUMONT, TEXAS.

SAW-HAMMERING MACHINE.

SPECIFICATION forming part of Letters Patent No. 501,769, dated July 18, 1893.

Application filed November 19, 1892. Serial No. 452,500. (No model.)

*To all whom it may concern:*

Be it known that I, THOMAS H. DILLON, of Beaumont, in the county of Jefferson and State of Texas, have invented a new and Improved Saw-Hammering Machine, of which the following is a full, clear, and exact description.

My invention relates to improvements in that class of machines which are adapted for use in hammering saws, and especially circular saws; and the object of my invention is to produce a simple machine which carries the saw in such a way that it may be held at any necessary or desired angle to suit the operator, which has a sliding anvil adapted to be adjusted so as to come opposite the various parts of the saw, which is provided with an adjustable hammer adapted to be brought opposite the anvil, which is constructed so as to cause a blow to expand both sides of the saw equally, and which in general is intended to facilitate the quick and efficient hammering of a saw.

To this end my invention consists in certain features of construction and combinations of the same, as will be hereinafter described and claimed.

Reference is to be had to the accompanying drawings forming a part of this specification, in which similar figures of reference indicate corresponding parts in all the views.

Figure 1:
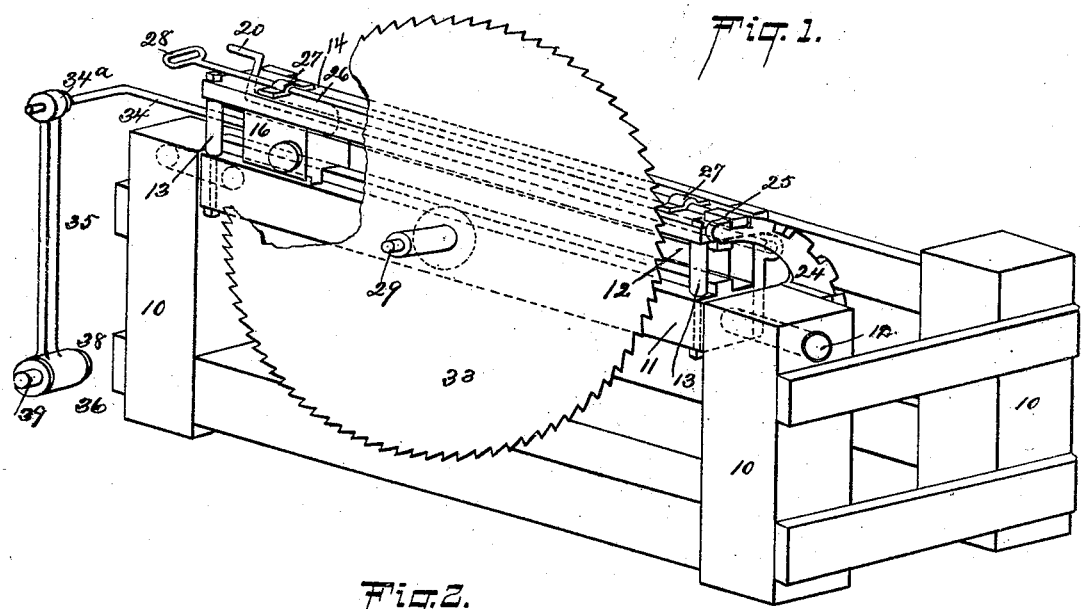
Figure 2:
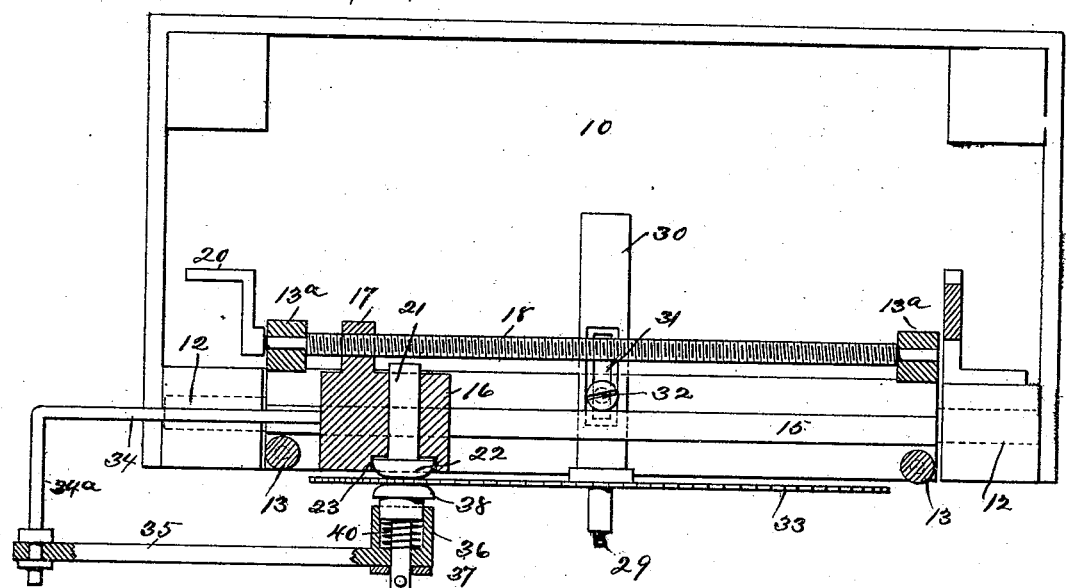

Figure 1 is a broken perspective view of the apparatus embodying my invention, showing a saw carried by the mandrel of the machine. Fig. 2 is a sectional plan of the same; and Fig. 3 is a broken vertical cross section showing the saw in position upon the oscillating frame, the frame and saw being tilted at an angle to the bench.

The machine is provided with a substantial bench 10 which, when the machine is used, is preferably mounted on a suitable turn-table so that it may be brought into a position to get the best light. On the front side and upper corner of this bench is a longitudinally extending beam 11 having end trunnions 12 which are journaled in the bench posts so that the beam may be rotated if desired; and extending upward from the corners of the beam are posts 13 and 13ª which carry a plate 14 at the top, and the latter is therefore parallel with the beam 11. The beam 11, the plate 14, and the connecting posts thus constitute a frame which is adapted to oscillate on the trunnions 12, and the plate and beam have on their adjacent sides dovetailed ribs 15 adapted to enter corresponding grooves in a slide block 16 which is held to move longitudinally between the beam 11 and plate 14. The slide block 16 has a lug 17 on its back side which is threaded to feed a screw 18, and the latter is arranged parallel with the oscillating frame and is journaled at the ends in the posts 13ª. The screw 18 has a crank 20 at one end by means of which it may be turned, and it will be seen that by turning the screw the slide block may be moved longitudinally so as to bring it into the desired position. The slide block has extending transversely through it, the shank 21 of a round faced anvil 22, the inner portion of the anvil being held in a recess 23 of the slide block. This anvil is adapted to be brought against one side of the saw, while the hammer is placed on the opposite side of the saw and opposite the anvil, as hereinafter described.

Opposite one end of the oscillating frame is a toothed quadrant 24 which is secured to the bench 10 and which is adapted to engage a latch 25 formed on the end of a rod 26, see Fig. 1, which rod is held to slide on the plate 14 beneath the keepers 27, and it terminates at one end in a handle 28 which extends outward beyond one end of the oscillating frame, and by moving the handle and rod back and forth the latch 25 may be placed out of and in engagement with the quadrant. It will be seen that when the latch engages the quadrant the oscillating frame will be held in a fixed position.

Near the center of the beam 11 of the oscillating frame is an outwardly extending mandrel 29 which has a shank 30, of rectangular cross section, and this shank is provided with a longitudinal slot 31 which receives a screw or bolt 32 by which the mandrel is fastened to the beam 11. This construction of the mandrel permits it to be adjusted in and out so as to bring the saw 33 in the right position. The saw is adapted to be slipped upon the mandrel in the usual way.

Secured to one end of the anvil block 16 is an arm 34 which extends outward parallel with the swinging or oscillating frame, and this arm is bent at its outer end, as shown at 34ª, and the bent end has pivoted to it the shank 35 of a hammer 36. The shank 35 is parallel with the body of the arm 34, and the length of the arm is such that the hammer 36 may be brought directly opposite the anvil 22. The hammer 36 comprises a case 37, which is open at one end; a round faced hammer head 38 which is held to slide in the case; a shank 39 which projects outward through the case, and a spring 40 which acts as a cushion and which is arranged within the case so as to normally press the hammer head outward.

In using the hammer it is brought opposite the anvil 22 so that the saw will be held between the anvil and the hammer head, and then the operator strikes upon the shank 39, with an ordinary hand hammer or sledge, and the saw being compressed in one direction between the hammer head and anvil, is expanded in the opposite direction.

Having thus described my invention, I claim as new and desire to secure by Letters Patent—

1. A machine of the character described, comprising an oscillating frame, a mandrel carried by the frame and adapted to carry a saw, an anvil adjustable longitudinally on the frame, and a swinging hammer adapted to be brought opposite the anvil, substantially as described.

2. A machine of the character described, comprising an oscillating frame, a mandrel extending at right angles to the frame and adjustable in and out thereon, a slide block held to move longitudinally on the frame, an anvil carried by the block, a bent arm secured to the slide block, and a swinging hammer carried by the arm and adapted to be brought opposite the anvil, substantially as described.

3. A machine of the character described, comprising an oscillating frame, a mandrel carried by the frame and adapted to carry a saw, an oppositely arranged hammer and anvil held to move longitudinally on the frame and adapted to clasp a saw between them, and a screw mechanism for adjusting the hammer and anvil, substantially as described.

4. The combination with the saw-holding frame, of a slide block held to move longitudinally on the frame, an anvil carried by the slide block and adapted to contact with the saw, a bent arm carried by the slide block, a hammer shank pivoted on the arm and having its free end terminating in a case, and a spring-pressed hammer head carried in the case and adapted to contact with the saw opposite the anvil, the hammer head having an outwardly extending shank, substantially as described.

THOMAS H. DILLON.

Witnesses:
W. A. LANGHAM,
R. E. DRAUGHON.